Jan. 3, 1967     A. R. KAHN     3,295,515

ELECTRODE ASSEMBLY

Filed Nov. 5, 1963

INVENTOR.
ALAN R. KAHN
BY Thomas L. Peterson

ATTORNEY

United States Patent Office 3,295,515
Patented Jan. 3, 1967

3,295,515
ELECTRODE ASSEMBLY
Alan R. Kahn, Fullerton, Calif., assignor to Beckman Instruments, Inc., a corporation of California
Filed Nov. 5, 1963, Ser. No. 321,460
8 Claims. (Cl. 128—2.06)

This invention relates to an electrode assembly and, more particularly, to an electrode assembly for detecting low level electrical signals from the skin of a living creature.

Pairs of electrodes are commonly used in the medical field for detecting electrical signals produced in a living body. However, when recording low level signals from the skin surface of a body, the present day electrodes often do not provide a true output. For example, present day electrodes are very sensitive to any mechanical disturbances resulting from the motion of the electrode on the skin. The movement of the skin relative to the electrode results in a mechanical disturbance of the electrolyte material in the electrode at the electrode metal-electrolyte interface and, hence, results in unwanted signals being produced, such signals being commonly known in the medical profession as motion artifacts. A further disadvantage of some of the commonly used electrodes are that they are quite large and difficult to secure to the skin surface and are impractical for remaining on a skin surface for any length of time. There are some electrode assemblies, however, which are essentially free from motion artifacts and are very small but they have the disadvantage of being extremely difficult to properly apply to a body and of having only a small area of skin contact and, hence, have high source impedance. The high source impedance results in interferences being picked up from the leads connected to electrode pairs and noise generated at the input of the amplifier to which they are connected.

It is, therefore, the principal object of the present invention to provide an electrode assembly for detecting low level electrical signals from the skin of a living body which has a large area of skin contact, and, thus, low source impedance, yet is free of motion artifacts.

Another object of the invention is to provide an electrode assembly for detecting low level electrical signals from a living body which may be easily applied to the body, can be used on active or movable bodies, is not uncomfortable to wear even underneath clothing and remains operable for periods of several days.

According to the principal aspect of the present invention, an electrode assembly is formed of a relatively thin disc of nonconducting material which has a large area of skin contact, and consequently a low source impedance, and may be easily attached to a body and comfortably worn. The disc has a rigid perforated wall interposed between the skin surface of the body and the metallic electrode component within the electrode assembly and an electrolyte space is provided between the electrode component and the rigid wall. The perforations or openings in the wall, which provide an electrolyte path between the electrode component and the skin, are sufficiently small so that the electrode component-electrolyte interface is protected from mechanical disturbances caused by the moving skin or body. By this novel arrangement, there is provided an electrode assembly which is free from artifacts due to the motion of the skin or body, yet also has a low source impedance.

Other objects, aspects and advantages will become apparent from the following description taken in connection with the accompanying drawing wherein:

FIG. 1a is a side view of the electrode assembly of the present invention, drawn to scale, and shown as applied to the skin surface of a living subject;

FIG. 1b is a central sectional view through an electrode assembly of the type commonly in use which has an electrolyte contact area equal to that of the electrode assembly shown in FIG. 1a;

Figures 1A, 1B:
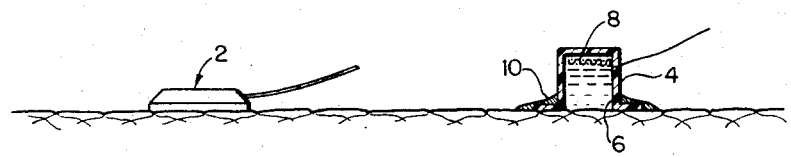

Referring now to FIG. 1a, an electrode assembly 2 incorporating the features of the present invention is illustrated which, as can be seen, has a low profile and thus has little weight and is not cumbersome for a person to wear on his body while electrical signals are being detected. The actual dimensions of this electrode assembly are about .75 inch diameter and about .15 inch in thickness although it could be smaller or larger depending upon the intended use. In FIG. 1b there is shown an electrode assembly 4 of the type commonly used today which is substantially free of motion artifacts. This electrode assembly has an electrolyte reservoir 6 and a silver wire screen electrode 8. The area of skin contact of an electrode assembly, which is determined by the diameter of the electrolyte reservoir, is one of the most important factors of the construction of an electrode assembly for the use intended here. The greater the area of skin contact, the lower is the source impedance of the electrode assembly. Thus, for comparative purposes the two electrode assemblies in FIGS. 1a and 1b have been illustrated as having equal diameter electrolyte reservoirs and, hence, equal areas of skin contact. However, as can be easily seen in FIG. 1b, the electrolyte reservoir 6 must be quite deep relative to the diameter of the reservoir so that the silver wire screen electrode 8 will not be affected by mechanical disturbances at the surface of the skin and, thus, not produce motion artifacts. It can be appreciated that the device shown in FIG. 1b would be extremely uncomfortable for a person to wear on his body and, as a matter of fact, it is difficult to secure to a body for any reasonable length of time. Usually a cement, indicated by numeral 10 in FIG. 1b, is required to secure the electrode assembly to a skin surface which requires considerable time to dry and does not effectively hold the electrode to the body for any length of time, especially if the body is moving. In contrast, the electrode assembly 2 of the present invention has a low profile and, thus, is comfortable to wear for long periods of time and readily secured to the body of the subject being examined, yet has an equal area of skin contact and is free of motion artifacts.

Figure 2:
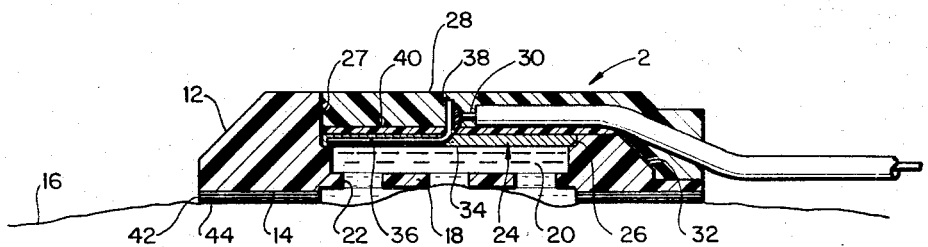
FIG. 2 is a central sectional view through the electrode assembly of the present invention, on an enlarged scale, with the skin of the body against which it is applied contacting a perforated wall of the assembly as would occur if the assembly were pressed against the body.
Figure 3:
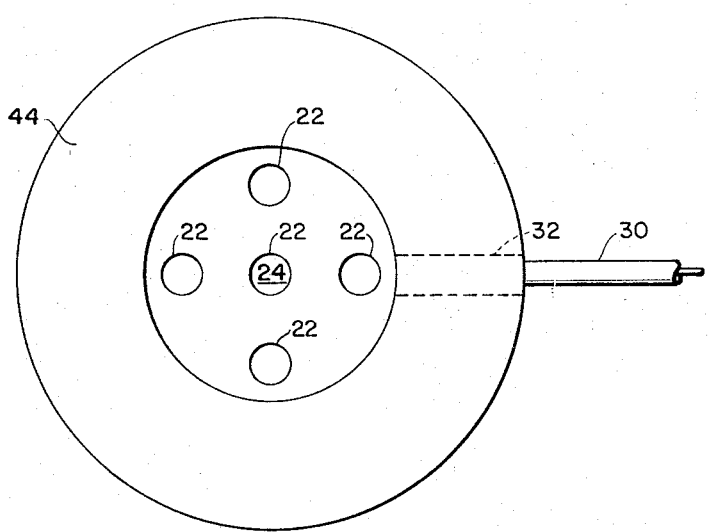
FIG. 3 is a bottom view, on an enlarged scale, of the electrode assembly of the present invention.

Referring now to FIG. 2 in detail, there is shown the construction of the electrode assembly of the present invention which permits the electrode to have a low profile and yet be unaffected by motion artifacts. The electrode assembly 2 comprises a relatively thin disc 12 of nonconducting material such as a plastic. Preferably, the ratio of the thickness of the disc 12 to its diameter is no greater than about 1:3 so that the electrode assembly will maintain its advantage of having a low profile and be readily attachable to a body and comfortable to wear. The disc 12 has an annular face 14 which contacts the skin of a body indicated by numeral 16. Centrally located within the annular face 14 is a perforated rigid wall 18 which is recessed behind the face. Behind the rigid wall 18 is an electrolyte reservoir 20 which is in communication with the outside of the electrode assembly through the perforations or openings 22 in the wall 18. Thus, the rigid wall 18 serves as a protective partition to prevent mechanical disturbances occurring at the surface or face of the disc from disturbing electrolyte within the reservoir 20.

The electrode component used in the assembly, generally designated by numeral 24, is positioned in the interior of the disc 12 at a predetermined distance from the wall 18 by the annular shoulder 26 extending inwardly from the wall of the opening 27 in the upper part of the disc. The electrode component is fixedly mounted on the shoulder 26 by an epoxy or Lucite material 28 which fills the opening 27 and the electrode is connected to an insulated conductor 30 which extends externally of the disc 12 through a channel 32. The channel is also filled with an epoxy or Lucite 28. Details of the electrode 24 and the method by which it is mounted within the disc 12 will be discussed below. It is important that the openings 22 in the rigid wall 18 be sufficiently small so that when the wall contacts a skin surface, the movement of the skin or compression thereof into the recessed portion of the front face of the disc 12 and into the openings 22 are insufficient to mechanically disturb any electrolyte in the reservoir 20 adjacent to the electrode-electrolyte interface 34. As a practical matter, the diameter of the openings 22 in the electrode assembly shown in FIG. 1a, which is drawn to scale, is .062 inch which meets this requirement. It follows that smaller sized openings would further prevent mechanical disturbance of electrolyte in reservoir 20 by movement of the skin. Thus, by this novel arrangement, an electrode assembly is provided that has a low profile in contrast to the electrode assemblies of the type seen in FIG. 1b yet is free of motion artifacts.

The electrode component 24 is preferably formed of a mixture of powdered silver and powdered silver chloride which is compacted into a unitary body substantially in accordance with the teachings of patent application entitled "Molded Metal-Metal Salt Reference Electrode," by Watanabe, Serial No. 718,826, filed March 3, 1958, now Patent No. 3,111,478 and assigned to the same assignee as the present invention. An electrode which has been found to produce the best results in this application is one which consists of 40% powdered silver and 60% powdered silver chloride by weight, however, other proportions of these materials as discussed in the aforementioned patent would be suitable.

When the silver and silver chloride are compressed into the electrode component 24, an L-shaped silver wire 36 is embedded in the material with the short arm of the L-shaped wire 38 extending at right angles to the plane of the electrode component. To mount the electrode in the disc 12, it is positioned on the shoulder 26 on the wall of opening 27. Then a first layer of epoxy material 40 is poured over the electrode 24 to seal the electrode component in place while still permitting the arm 38 of the silver wire 36 to protrude through the first layer so that it is free to be connected to the conductor 30. This first layer 40 provides an important function in that it isolates the conductor 30 from any electrolyte which might be absorbed by or leak around the electrode component 24. Thus, when the conductor 30, which generally is a copper wire, is soldered to the arm 38 of the silver wire, no electrolyte can contact the conductor which would produce errors in the signal output of the electrode assembly. After the conductor 30 is soldered to the silver wire 38, the remainder of the opening 27 in the upper portion of the disc 12 and the channel 32 which receives the conductor 30 are completely filled with epoxy or Lucite material to seal the electrode and conductor wires into the electrode assembly. Electrode components 24 other than that described above may be utilized in the electrode assembly of the present invention. An example of another electrode component is a silver-silver chloride electrode which is produced by an electrolytic treatment of a silver surface with silver chloride. Also, electrode components formed of powdered metals and powdered salts other than silver and silver chloride may be used but without the advantageous results obtained by the silver-silver chloride pellet electrode.

In utilizing the electrode assembly of the present invention, it may be easily attached to a body of a person or animal by applying an adhesive to the face 14 of the disc 12 and merely placing the disc on the body and pressing it slightly to secure it to the body by the adhesive. However, another means may be used for attaching the electrode assembly to the body which permits a ready filling of the electrolyte reservoir 20 with a suitable electrolyte without permitting electrolyte to contact the face 14 which might render some of the adhesive ineffective. To this end, there may be provided a washer shaped adhesive tape, generally referred to by numeral 42, formed of an intermediate layer of paper or plastic and two outer layers of adhesive and a fourth layer of paper, not shown in the drawing. The four layer washer is applied to the face 14 of the electrode assembly and then the electrolyte reservoir is filled with an electrolyte such as a jelly containing sodium chloride by means of a syringe inserted through the openings 22. Preferably, sufficient electrolyte is provided which completely fills the reservoir 20, the openings 22 and the recessed portion of the front face 14 of the electrode assembly. Generally there is an excess of electrolyte which will extend beyond the face 14 of the assembly which may be removed by wiping a flat surface such as the syringe needle across the face of the disc. Thereafter, the outer layer of paper, not shown, on the adhesive washer 42 is removed thus leaving a layer of adhesive 44 which is free of any electrolyte and which may be utilized to securely fasten the electrode assembly to a body. When the electrode assembly is secured to the body in the manner described above, the electrolyte permeates the outer layer of the skin and provides a salt bridge type of electrical connection between the layers of the skin and the electrode component 24 within the electrode assembly.

An electrode assembly made in accordance with the novel teachings of the present invention has been tested on the chest of a human subject for periods as long as four days for a single application. During this time the subject went about his normal daily activities including a shower, exercise, etc., while being free of motion artifacts. The electrode has also been used to monitor the electrocardiogram from the chest and the limbs of a subject, electromyographic signals from the skin over various muscles, fetal electrocardiographic signals from the abdominal surface of pregnant women, electro-oculographic signals indicating eye motions by application on the skin near the eyes, and electroencephalographic applications from appropriate positions on the scalp.

Although several embodiments of the invention have been disclosed herein for purposes of illustration, it will be understood that various changes can be made in the form, details, arrangement and proportions of the electrode assembly without departing from the spirit and scope of the invention as defined by the appended claims.

What is claimed is:
1. An electrode assembly for detecting low level electrical signals from the skin of a living creature comprising:
 a relatively thin disc of nonconducting material having a face for contacting a skin surface;
 said disc having a rigid wall recessed behind said face;
 said disc having an electrolyte reservoir behind said wall;
 an electrode component fixedly mounted in said reservoir and spaced behind said wall;
 said rigid wall of said disc having a plurality of openings therethrough of sufficiently small size so that when said wall contacts a skin surface the movement of the skin or compression thereof into the openings are insufficient to mechanically disturb electrolyte closely adjacent to said electrode component; and a conductor connected to said electrode component and extending to the exterior of said disc.

2. An electrode assembly for detecting low level electrical signals from the skin surface of a living creature comprising:
- a disc of nonconducting material having a face for contacting a skin surface, said disc having a thickness substantially less than the breadth of said disc;
- a substantially flat electrode component fixedly mounted in said disc substantially parallel to said face;
- said disc having a rigid wall recessed behind said face and spaced from said electrode component to provide an electrolyte reservoir between said electrode component and said wall, said wall having means defining a plurality of openings therethrough for holding electrolyte, each of said openings having a diameter of about 0.062 inch or less; and
- a conductor connected to said electrode component and extending to the exterior of said disc.

3. An electrode assembly as set forth in claim 2 wherein said conductor is disposed behind said electrode component on the opposite side of said electrolyte reservoir and embedded in said disc whereby said conductor is isolated from any electrolyte.

4. An electrode assembly for detecting low level electrical signals from the skin surface of a living creature comprising:
- a substantially circular disc of nonconducting material having an annular face adjacent the edge of said disc for contacting a skin surface, said disc having a thickness substantially less than the diameter of said disc;
- a substantially flat electrode component centrally positioned with respect to said disc and fixedly mounted therein, said electrode component being substantially parallel to said face;
- said electrode component comprising a compacted, unitary body of a mixture of powdered silver and powdered silver chloride;
- said disc having a rigid wall recessed behind said annular face and spaced from said electrode component to provide an electrolyte reservoir between said electrode component and said wall, said wall having means defining a plurality of openings therethrough for holding electrolyte, each of said openings having a diameter of about 0.062 inch;
- said electrode component including a silver wire having a portion embedded therein and the remainder extending behind said electrode component on the opposite side of said electrolyte reservoir; and
- a conductor of a metal other than silver connected to said silver wire and extending to the exterior of said disc, said conductor being spaced behind said electrode component and embedded in said disc whereby said conductor is isolated from any electrolyte.

5. An electrode assembly for detecting low-level electrical signals from the skin of a living creature comprising:
- a relatively thin disc of nonconducting material having a face for contacting a skin surface;
- said disc having a rigid wall adjacent to said face;
- said disc having a chamber behind said wall;
- an electrode component fixedly mounted in said chamber;
- said rigid wall having a plurality of openings therethrough for holding electrolyte, each of said openings having a diameter of about 0.062 inch or less; and
- a conductor connected to said electrode component and extending to the exterior of said disc.

6. An electrode assembly as set forth in claim 5 wherein said rigid wall is recessed behind said face to provide a space for electrolyte between said wall and a skin surface.

7. An electrode assembly for detecting low level electrical signals from the skin of a living creature comprising:
- a relatively thin disc of nonconducting material having a face for contacting a skin surface;
- said disc having a rigid wall adjacent to said face;
- said disc having a chamber behind said wall;
- an electrode component fixedly mounted in said chamber;
- said rigid wall of said disc having a plurality of openings therethrough for holding electrolyte, each of said openings having a diameter of about 0.062 inch; and
- a conductor connected to said electrode component and extending to the exterior of said disc.

8. An electrode assembly as set forth in claim 7 wherein said rigid wall is recessed behind said face to provide a space for electrolyte between said wall and a skin surface.

References Cited by the Examiner

UNITED STATES PATENTS

| | | | |
|---|---|---|---|
| 3,111,478 | 11/1963 | Watanabe | 204—195 |
| 3,151,619 | 10/1964 | Sullivan | 128—418 X |
| 3,170,459 | 2/1965 | Phipps et al. | 128—418 X |

RICHARD A. GAUDET, *Primary Examiner.*

W. E. KAMM, *Assistant Examiner.*